United States Patent [19]
Miller

[11] Patent Number: 6,163,707
[45] Date of Patent: Dec. 19, 2000

[54] CDMA POWER CONTROL ERROR REDUCTION VIA PREDICTIVE FILTERING

[75] Inventor: John Earle Miller, Plano, Tex.

[73] Assignee: Northern Telecom Limited, Montreal, Canada

[21] Appl. No.: 09/034,982

[22] Filed: Mar. 4, 1998

[51] Int. Cl.[7] .................................................... H04B 7/00
[52] U.S. Cl. ...................... 455/522; 455/67.1; 455/115; 455/561
[58] Field of Search .................................. 455/38.3, 67.1, 455/69, 115, 522, 561, 550; 375/200

[56] References Cited

U.S. PATENT DOCUMENTS

| | | | |
|---|---|---|---|
| 5,305,468 | 4/1994 | Bruckert et al. | 455/69 |
| 5,812,938 | 9/1998 | Gilhousen et al. | 455/69 |
| 5,878,329 | 3/1999 | Mallinckrodt | 455/69 |

OTHER PUBLICATIONS

Qiang Shen; Krzymien, W.A., Performance improvement of closed loop power control in CDMA cellular mobile communication systems. IEEE Catalog Number: 96CH35894 pp. 56–60, Apr. 1996.

Mecklenbrauker, IEEE paper, vol. 5, No. 4, Apr. 98, Remarks on the Minimum Phase Property of Optimal Prediction Error Filters and Some Related Questions.

Sim, M.L., IEEE catalog No: 98TH8384, Study on the characteristics of Predicitive Closed Loop Power Control Algorithms for a Cellular DS/CDMA System, Oct. 1998.

Zhang Yongsheng, IEEE Catalog No: 97TH8255, Power Control Based on Adaptive Prediction in the CDMA/TDAM System, Aug. 1997.

Tanskanen, et al., "Predictive Closed Loop Power Control for Mobile CDMA Systems,"(1997).

*Primary Examiner*—Dwayne D. Bost
*Assistant Examiner*—Sonny Trinh
*Attorney, Agent, or Firm*—John D. Crane

[57] ABSTRACT

The power control process receives a signal from the radiotelephone over the time varying reverse link. The received signal is demodulated and decoded. The resulting signal is used to estimate the $^Ew/I_0$. The $^Ew/f_0$ is compared to a threshold $^Ew/I_0$ to generate a power control error. This error is input to a prediction filter that anticipates increases or decreases in the power control error over the time interval of the reverse link. The result from the prediction filter is used to modify the power control bit accordingly before transmission to the radiotelephone.

3 Claims, 1 Drawing Sheet

CDMA POWER CONTROL ERROR REDUCTION VIA PREDICTIVE FILTERING

BACKGROUND OF THE INVENTION

I. Field of the Invention

The present invention relates to radio communications. More particularly, the present invention relates to power control in a code division multiple access cellular radiotelephone system.

II. Description of the Related Art

Multiple access techniques are some of the most efficient techniques for utilizing the limited radio frequency spectrum. Examples of such techniques include time division multiple access (TDMA), frequency division multiple access (FDMA), and code division multiple access (CDMA).

CDMA wireless technology, governed by Electronic Industry Association/Telecommunication Industry Association Interim Specification—95 (IS-95), employs a spread spectrum technique for the transmission of information. A spread spectrum system uses a modulation technique that spreads the transmitted signal over a wide frequency band. This frequency band is typically substantially wider than the minimum bandwidth required to transmit the signal.

A form of frequency diversity is obtained by spreading the transmitted signal over a wide frequency range. Since only part of a signal is typically affected by a frequency selective fade, the remaining spectrum of the transmitted signal is unaffected. A receiver that receives the spread spectrum signal, therefore, is affected less by the fade condition than a receiver using other types of signals.

The spread spectrum technique is accomplished by modulating each base band data signal to be transmitted with a unique wide band spreading code. Using this technique, a signal having a bandwidth of only a few kilohertz can be spread over a bandwidth of more than a megahertz. Typical examples of spread spectrum techniques are found in M. K. Simon, *Spread Spectrum Communications*, Volume I, pp. 262–358.

In a CDMA-type radiotelephone system, multiple signals are transmitted simultaneously at the same frequency. A particular receiver then determines which signal is intended for that receiver by a unique spreading code in each signal. The signals at that frequency, without the particular spreading code intended for that particular receiver, appear to be noise to that receiver and are ignored.

Since multiple radiotelephones and base stations transmit on the same frequency, power control is an important component of the CDMA modulation technique. A higher power output by a radiotelephone and/or base station increases the interference experienced by the other radiotelephones and base stations in the system. In order to keep the radiotelephones and base stations from transmitting too much power, thereby lowering system capacity, some form of power control must be implemented.

The power control is performed by two power control loops: open loop and closed loop power control. The radiotelephone, in performing the open loop control, uses a received signal strength indicator, well known in the art, to estimate the signal path power loss from the base station to the radiotelephone. The radiotelephone can then compensate the power loss incurred over the forward channel by transmitting at a higher power level over the reverse channel.

Since the loss on the forward channel may not be the same as the loss on the reverse channel, the open loop power control is just an initial estimate that must be corrected. The correction is the closed loop power control. This is accomplished by the base station transmitting a power control bit to the radiotelephone instructing the radiotelephone to adjust its transmit power in response to the channel conditions.

If the power control algorithm is perfect, the radiotelephone transmitter is able to perfectly match the losses and distortions induced on its signal by the channel. However, since there is a delay between the base station determining the power control bit to be transmitted and the radiotelephone actually receiving the power control bit, the channel conditions may have changed.

If the channel encountered by the radiotelephone signal changes a great deal over the delay period, the radiotelephone may not be able to adjust its transmit power to match the current channel conditions. This may cause serious problems with the system capacity. There is a resulting unforeseen need for a faster power control process that takes into account the time varying channel conditions.

SUMMARY OF THE INVENTION

The present invention encompasses a process for power control in a communication system. In the preferred embodiment, the communication system is a CDMA cellular radiotelephone system. The system is comprised of a radiotelephone and a base station.

The radiotelephone transmits a signal over a time varying channel. The base station receives the signal and demodulates/decodes it. A signal quality metric for the received signal is estimated. In the preferred embodiment, this metric is $^Ew/I_0$ which represents the quotient of the symbol energy and the interference and thermal noise spectral density.

A signal quality error signal is generated in response to the signal quality metric. This error signal is input to a prediction filter that modifies the error signal based on the anticipated channel conditions. A power control command is then generated in response to the modified error signal. The power control command is then transmitted to the radiotelephone for processing.

DETAILED DESCRIPTION OF THE PREFERRED EMBODIMENT

Figure 1:
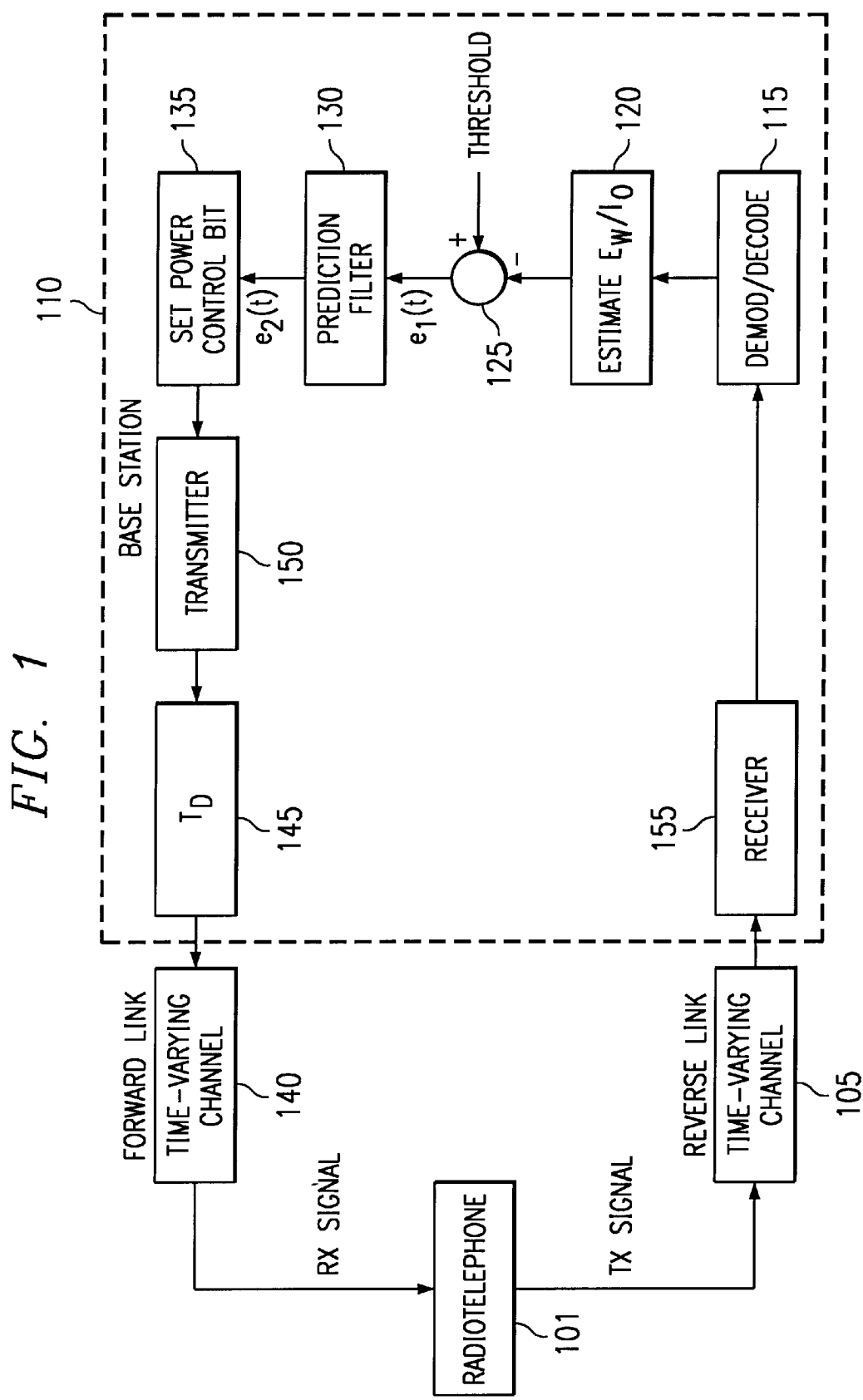
FIG. 1 shows a flow diagram of the communication paths between a radiotelephone and a base station in accordance with the present invention.

The power control process of the present invention provides a prediction filter in the power control loop. The filter enables the power control loop to anticipate possible changes that occur on the reverse link over a delay interval. Once anticipated, the power control decisions are adjusted accordingly.

FIG. 1 illustrates a flow diagram of a mobile radiotelephone and a base station. The radiotelephone (101) transmits a signal to the base station (110) over the time varying reverse link (105). The transmitted signal is subject to propagation loss, slowly varying shadow fading, and fast multipath fading. The signal, received by the base station's receiver (155), is therefore altered from the transmitted signal.

The received signal is demodulated and decoded (115) using a maximum likelihood decoder. Demodulation and decoding of the received signal are well known in the art and will not be discussed further.

As is well known in the art, CDMA radiotelephone systems may use quadrature phase shift keying (QPSK) modulation. Alternate embodiments use other forms of modulation and coding.

The recovered signal is used to estimate $E_w/I_0$ (120). The $E_w/I_0$ ratio is a standard quality measurement for digital communications system performance. The ratio expresses the symbol-energy-to-noise-density of the received signal. $E_w/I_0$ can be considered a metric that characterizes the performance of one communication system over another; the smaller the required $E_w/I_0$ the more efficient is the system modulation and detection process for a given probability of error. A more detailed discussion of this concept can be seen in B. Sklar, *Digital Communications, Fundamentals and Applications*, Chapter 3 (1988).

The $E_w/I_0$ is measured for a power control group duration (a sixteenth of a frame). The process of measuring $E_w/I_0$ is well known in the art. The measured $E_w/I_0$ is then compared to a threshold or target $E_w/I_0$ (125).

The target $E_w/I_0$ is determined by what power level is required to maintain a required frame error rate (FER). Network operators typically set the required FER. The target $E_w/I_0$ is adjusted on a frame by frame basis as channel conditions change. The target is modified in such a way as to maintain the required FER.

The comparison (125) of the measured $E_w/I_0$ with the target $E_w/I_0$ generates a power control error, $e_1(t)$. In an ideal case, $e_1(t)$ would be zero since the open and closed loop power control processes would eliminate any power control problems. However, due to the time varying nature of the channel and delay $T_D$ (145) between the radiotelephone (101) and the base station (110), $e_1(t)$ is not zero, indicating some power control error.

Under certain conditions, it may be possible to anticipate changes in the channel that are experienced by the radiotelephone's transmitted signal. This is especially true if the channel is narrowband and some of the distortions arise from relative motion between the mobile transmitter and the base station receiver.

The power control error is input to a prediction filter (130). The filter anticipates increases or decreases in $e_1(t)$ over the time interval $T_D$. The filter (130) modifies the current power control error, $e_1(t)$, and generates an adjusted power control error, $e_2(t)$.

The prediction filter (130), that may take on many forms, performs modification of the power control bit decision. The prediction filter anticipates possible changes in the channel that may occur during the delays that are encountered during the loop processing, $T_D$.

In the preferred embodiment, the prediction filter is a linear predictor. A linear prediction filter exploits knowledge of the channel statistics to estimate the channel value that may occur at a future time. A class of these digital filters, referred to as one-step linear predictors, is well known in the art.

Time series data may be modeled by a combination of past values and outputs of a processor driven by past values. If the current value at time n of a time series of data is x[n], it is possible to form an estimate of x[n], subsequently referred to as $x_{est}[n]$. A difference equation representation of this is given by:

$$x_{est}[n] = \sum_{k=1}^{p} a[k]x[n-k] + \sum_{k=1}^{q} b[k]u[n-k]$$

where x[n] is the current value of x at time n, a[k] and b[k] are filter coefficients and u[n−k] is a past value of the difference equation output and represents the output of the filter that is driven by x as an input. Note that the current value of x[n] is based on past values of x and u.

It is possible to choose the values of a[k] and b[k] such that the error between a value predicted for x[n] ($x_{est}[n]$) is minimized in a mean-squared sense. This is accomplished by using the linear filter comprised of coefficients a[k] and b[k], the past values of x (x[n−1], x[n−2], . . . x[n−p]), and the actual value of x[n]. This condition minimizes the power of the difference between the actual data point, x[n], and the estimate of the data point made by the filter, $x_{est}[n]$.

Using these well-known techniques, it is possible to modify the filter slightly to predict an arbitrary number of $T_D$ delays in the future. It would then be possible to design a filter (coefficients a and b) for an arbitrary processing delay $T_D$.

The above described one-step linear predictor filter is provided for illustration purposes. Most prediction filters will operate in the present invention. Such filters are well known in the art and illustrated in Kay, Steven M., *Modern Spectral Estimation*, (1988) available from Prentice Hall and Haykin, Simon, *Adaptive Filter Theory*, 2nd Ed., (1991) available from Prentice Hall.

The adjusted power control error is input to a power control bit function (135). This function (135) makes the decision, based on $e_2(t)$, whether to modify the radiotelephone's transmit power. If $e_2(t)$ is less than zero, the radiotelephone's transmit power should be adjusted upward. If $e_2(t)$ is greater than zero, the radiotelephone should reduce its transmit power.

The power control bit is incorporated into a data frame to be transmitted over the time-varying forward channel (140) to the radiotelephone (101). This power control bit instructs the radiotelephone's transmitter to increase or decrease power by 1 dB for each power control bit received. For example, if the radiotelephone (101) receives a power control bit that is set to a logical 0, the radiotelephone (101) increases transmitter power by 1 dB. If the radiotelephone (101) then receives a power control bit that is set to a logical 1, the radiotelephone (101) decreases transmitter power by 1 dB.

This power control bit is well known in the art and is discussed in further detail in the CDMA standard IS-95A. Alternate embodiments use multiple power control bits to adjust the radiotelephone's transmitter power in different step sizes.

The data frame with the power control bit is transmitted by the base station transmitter (150) to the radiotelephone (101) over the forward link. The radiotelephone (101) receives the frame, after the channel delay of $T_D$, and processes the power control decision.

The incorporation of the prediction filter enables the control loop to anticipate possible changes in the radiotelephone to base station channel that occur over the time interval $T_D$. This helps the power control process compensate for distortions that occur on non-stationary channels. Ultimately, the power control process of the present invention reduces power control error, thereby decreasing the multi-access interference generated by radiotelephone transmitter.

I claim:

1. A method of controlling the transmission power of a radiotelephone in a code division multiple access communication system, the method comprising the steps of:

receiving at a base station a spread spectrum communication signal transmitted by a radio telephone over a time-varying reverse link communication channel;

demodulating and decoding the communication signal;

estimating a $^Ew/I_0$ ratio for the received signal;

comparing the $^Ew/I_0$ ratio to a predetermined threshold to generate an error signal, the threshold being that which is required to maintain a selected frame error rate;

anticipating changers in the error signal based on communication channel statistics over a predetermined time interval;

modifying the error signal based on the anticipation of changes in the communication channel;

generating a power control command that represents the modified error signal, the command constituting one or more power control bits included in one or more data frames; and transmitting the power control bits in a spread spectrum signal over the command channel's forward link to the radiotelephone for processing so that the $^Ew/I_0$ of the communication signals transmitted by the radiotelephone is accordingly adjusted.

2. The step of claim 1 wherein the signal quality error signal is based on the anticipation of changes in the communication signal over a predetermined time period.

3. The method of claim 1 wherein the step of modifying includes the step of using a prediction filter to anticipate the changes in the communication channel.

* * * * *